United States Patent
Zhao et al.

(10) Patent No.: US 8,035,331 B2
(45) Date of Patent: Oct. 11, 2011

(54) AC/DC CONVERTING CIRCUIT AND MOTOR CONTROLLER USING THE SAME

(75) Inventors: Yong Zhao, Zhongshan (CN); Junqiang Zhang, Zhongshan (CN); Dawei Liu, Zhongshan (CN); Songfa Tang, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 200 days.

(21) Appl. No.: 12/542,752

(22) Filed: Aug. 18, 2009

(65) Prior Publication Data
US 2010/0207556 A1 Aug. 19, 2010

(30) Foreign Application Priority Data
Feb. 17, 2009 (CN) .................. 2009 2 0051528 U

(51) Int. Cl.
*H02M 7/04* (2006.01)
*H02P 1/00* (2006.01)

(52) U.S. Cl. ........... 318/722; 363/52; 363/108; 363/143

(58) Field of Classification Search .............. 318/400.3, 318/441, 442, 440, 722; 363/34, 44, 81, 363/84, 88, 52, 114, 108, 125, 126
See application file for complete search history.

(56) References Cited

U.S. PATENT DOCUMENTS

| | | | |
|---|---|---|---|
| 3,646,423 A * | 2/1972 | Tatematsu et al. | 363/54 |
| 5,491,624 A * | 2/1996 | Levran et al. | 363/87 |
| 5,537,006 A * | 7/1996 | Wilson et al. | 315/127 |
| 6,353,546 B1 * | 3/2002 | Tsay | 363/89 |
| 6,765,359 B2 * | 7/2004 | Lin | 318/442 |
| 7,397,680 B2 * | 7/2008 | Odell | 363/143 |
| 7,715,216 B2 * | 5/2010 | Liu et al. | 363/89 |
| 2007/0053215 A1 * | 3/2007 | Wang et al. | 363/53 |
| 2007/0247084 A1 * | 10/2007 | Zhao | 315/291 |

* cited by examiner

*Primary Examiner* — Eduardo Colon-Santana
(74) *Attorney, Agent, or Firm* — Matthias Scholl P.C.; Scholl Matthias

(57) ABSTRACT

An AC/DC converting circuit, has a full-bridge rectifier having two input terminals and two output terminals, a first capacitor, a second capacitor, an electronic switch having a control terminal, a trigger circuit having an input terminal and an output terminal, and a detecting circuit having an input terminal and an output terminal. The first capacitor and the second capacitor are serially connected between the output terminals of the full-bridge rectifier, the input terminals of the full-bridge rectifier are connected to an AC input, one end of the electronic switch is connected between the first capacitor and the second capacitor, the other end of the electronic switch is connected to one of the output terminals of the full-bridge rectifier, the input terminal and the output terminal of the detecting circuit are connected to the output terminals of the full-bridge rectifier, the output terminal of the detecting circuit is connected to an input terminal of the trigger circuit, and the output terminal of the trigger circuit is connected to the control terminal of the electronic switch.

16 Claims, 5 Drawing Sheets

AC/DC CONVERTING CIRCUIT AND MOTOR CONTROLLER USING THE SAME

CROSS-REFERENCE TO RELATED APPLICATIONS

Pursuant to 35 U.S.C. §119 and the Paris Convention Treaty, this application claims the benefit of Chinese Patent Application No. 200920051528.6 filed on Feb. 17, 2009, the contents of which are incorporated herein by reference.

BACKGROUND OF THE INVENTION

1. Field of the Invention

The invention relates to an AC/DC converting circuit and a motor controller using the same.

2. Description of the Related Art

AC/DC converting circuits are widely used in current motor controllers. However, there are several problems with the conventional AC/DC converting circuits: 1) the circuit is complex and expensive and comprises large components; 2) manual switching between a full-bridge rectifier and a full-bridge double-voltage circuit makes use of the circuit inconvenient; and 3) erroneous switching may increase an output voltage and thus bringing damage to the motor controller and the motor, which affects safety and reliability of the circuit.

For motor controllers using the conventional AC/DC converting circuits, the same problems as above exist.

SUMMARY OF THE INVENTION

In view of the above-described problem, it is one objective of the invention to provide an AC/DC converting circuit that is cost-effective, safe and reliable, and features convenient use.

It is another objective of the invention to provide a motor controller comprising an AC/DC converting circuit that is cost-effective, safe and reliable, and features convenient use.

To achieve the above objectives, in accordance with one embodiment of the invention, provided is an AC/DC converting circuit, comprising a full-bridge double voltage circuit, comprising a full-bridge rectifier having two input terminals and two output terminals, a first capacitor, and a second capacitor, an electronic switch having a control terminal, a trigger circuit having an input terminal and an output terminal, and a detecting circuit having an input terminal and an output terminal. The first capacitor and the second capacitor are serially connected between the output terminals of the full-bridge rectifier, the input terminals of the full-bridge rectifier are connected to an AC input, one end of the electronic switch is connected between the first capacitor and the second capacitor, the other end of the electronic switch is connected to one of the output terminals of the full-bridge rectifier, the input terminal and the output terminal of the detecting circuit are connected to the output terminals of the full-bridge rectifier, the output terminal of the detecting circuit is connected to an input terminal of the trigger circuit, and the output terminal of the trigger circuit is connected to the control terminal of the electronic switch.

In a class of this embodiment, the electronic switch is a bidirectional triode thyristor.

In a class of this embodiment, the detecting circuit comprises a first resistor, a second resistor, and a third resistor.

In a class of this embodiment, the first resistor, the second resistor, and the third resistor are serially connected.

In a class of this embodiment, the trigger circuit is a hysteresis loop comparison circuit.

Advantage of the AC/DC converting circuit comprise: 1) the circuit is simple and cost-effective, and components therein are small; 2) automatic switching between a full-bridge rectifier and a full-bridge double-voltage circuit makes the invention convenient for use; 3) automatic switching between the full-bridge rectifier and the full-bridge double-voltage circuit guarantees a stable output voltage, which brings no damage to the motor and the motor controller, and improves safety and reliability of the circuit.

In accordance with another embodiment of the invention, provided is a motor controller, comprising a microprocessor unit having an input terminal and an output terminal, and an AC/DC converting circuit, comprising a full-bridge double voltage circuit, comprising a full-bridge rectifier having two input terminals and two output terminals, a first capacitor, and a second capacitor, an electronic switch having a control terminal, and a detecting circuit having an input terminal and an output terminal. The first capacitor and the second capacitor are serially connected between the output terminals of the full-bridge rectifier, the input terminals of the full-bridge rectifier are connected to an AC input, one end of the electronic switch is connected between the first capacitor and the second capacitor, the other end of the electronic switch is connected to one of the output terminals of the full-bridge rectifier, the input terminal and the output terminal of the detecting circuit are connected to the output terminals of the full-bridge rectifier, the output terminal of the detecting circuit is connected to the input terminal of the microprocessor unit, and the output terminal of the microprocessor unit is connected to the control end of the electronic switch.

In a class of this embodiment, the electronic switch is a bidirectional triode thyristor.

In a class of this embodiment, the detecting circuit comprises a first resistor, a second resistor, and a third resistor.

In a class of this embodiment, the first resistor, the second resistor, and the third resistor are serially connected.

In a class of this embodiment, the microprocessor unit is a single chip processor or a digital signal processor.

In accordance with a further embodiment of the invention, provided is a motor controller, comprising a photoelectric coupling and driving circuit, a microprocessor unit having an input terminal and an output terminal, and an AC/DC converting circuit, comprising a full-bridge double voltage circuit, comprising a full-bridge rectifier having two input terminals and two output terminals, a first capacitor, and a second capacitor, an electronic switch having a control terminal, and a detecting circuit having an input terminal and an output terminal. The first capacitor and the second capacitor are serially connected between the output terminals of the full-bridge rectifier, the input terminals of the full-bridge rectifier are connected to an AC input, one end of the electronic switch is connected between the first capacitor and the second capacitor, the other end of the electronic switch is connected to one of the output terminals of the full-bridge rectifier, the input terminal and the output terminal of the detecting circuit are connected to the output terminals of the full-bridge rectifier, the output terminal of the detecting circuit is connected to the input terminal of the microprocessor unit, the output terminal of the microprocessor unit is connected to the control end of the electronic switch, and the microprocessor unit is connected to the electronic switch via the photoelectric coupling and driving circuit.

In a class of this embodiment, the electronic switch is a bidirectional triode thyristor.

In a class of this embodiment, the detecting circuit comprises a first resistor, a second resistor, and a third resistor.

In a class of this embodiment, the first resistor, the second resistor, and the third resistor are serially connected.

In a class of this embodiment, the microprocessor unit is a single chip processor or a digital signal processor.

In a class of this embodiment, the photoelectric coupling and driving circuit comprises a fourth resistor, a fifth resistor, a sixth resistor, a seventh resistor, an eighth resistor, a ninth resistor, a third capacitor, a fourth capacitor, a fifth capacitor, a triode, and a photoelectric coupler.

Advantage of the motor controller comprise: 1) the AC/DC converting circuit is simple and cost-effective, and components therein are small; 2) automatic switching between a full-bridge rectifier and a full-bridge double-voltage circuit makes the invention convenient for use; 3) automatic switching between the full-bridge rectifier and the full-bridge double-voltage circuit guarantees a stable output voltage, which brings no damage to the motor and the motor controller, and improves safety and reliability of the circuit; 4) the microprocessor unit can be used as a trigger circuit, which further reduces cost; 5) the microprocessor unit is connected to the electronic switch via the photoelectric coupling and driving circuit, which separates a heavy-current part with a weak-current part, and further protect the motor controller.

BRIEF DESCRIPTION OF THE DRAWINGS

The invention is described hereinafter with reference to accompanying drawings, in which.

DETAILED DESCRIPTION OF THE EMBODIMENTS

Figure 1:
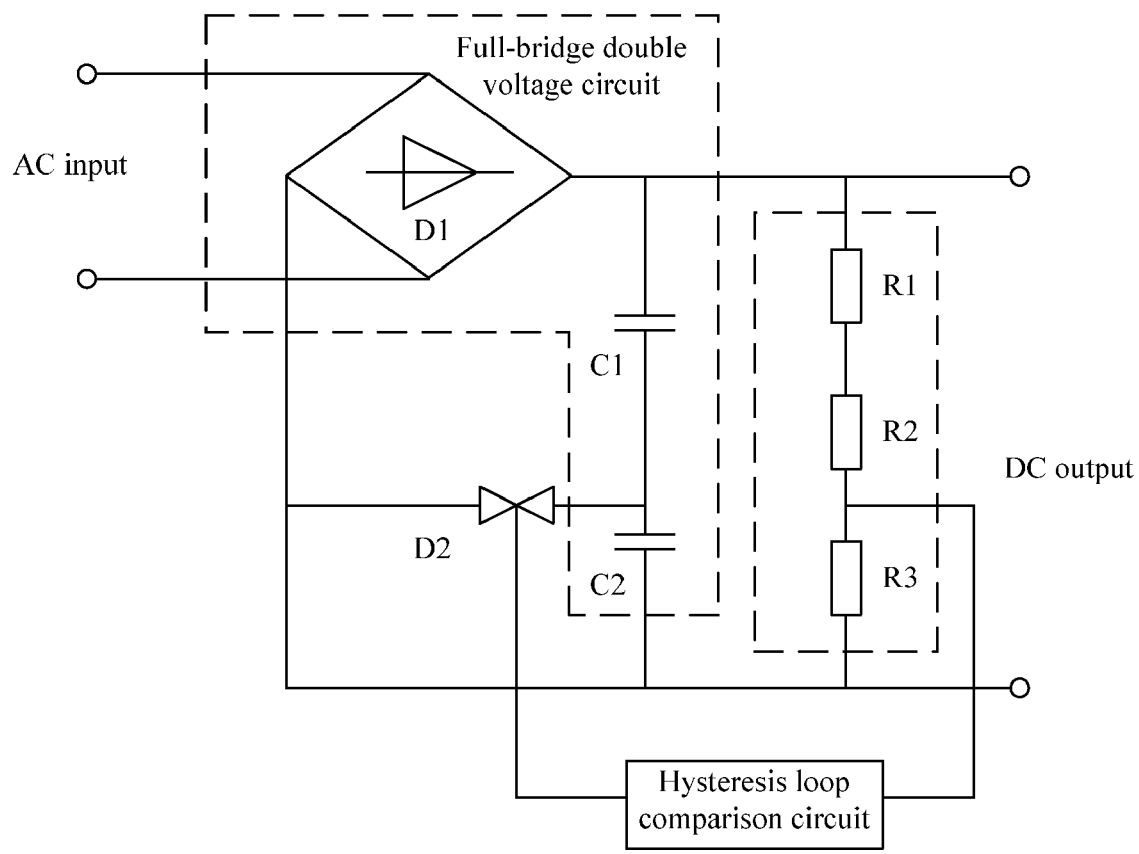
FIG. 1 is a block diagram of an AC/DC converting circuit of an embodiment of the invention.

As shown in FIG. 1, an AC/DC converting circuit of the invention comprises a full-bridge double voltage circuit, an electronic switch D2 having a control terminal, a trigger circuit having an input terminal and an output terminal, and a detecting circuit having an input terminal and an output terminal.

The full-bridge double voltage circuit comprises a full-bridge rectifier D1 having two input terminals and two output terminals, a first capacitor C1, and a second capacitor C2.

The detecting circuit comprises a first resistor, a second resistor, and a third resistor, and the first resistor, the second resistor, and the third resistor are serially connected.

The first capacitor C1 and the second capacitor C2 are serially connected between the output terminals of the full-bridge rectifier.

The input terminals of the full-bridge rectifier are connected to an AC input.

One end of the electronic switch D2 is connected between the first capacitor and the second capacitor, and the other end of the electronic switch D2 is connected to one of the output terminals of the full-bridge rectifier.

The input terminal and the output terminal of the detecting circuit are connected to the output terminals of the full-bridge rectifier, and the output terminal of the detecting circuit is connected to an input terminal of the trigger circuit.

The output terminal of the trigger circuit is connected to the control terminal of the electronic switch D2.

In this embodiment, the electronic switch D2 is a bidirectional triode thyristor, and the trigger circuit is a hysteresis loop comparison circuit.

Figure 2:
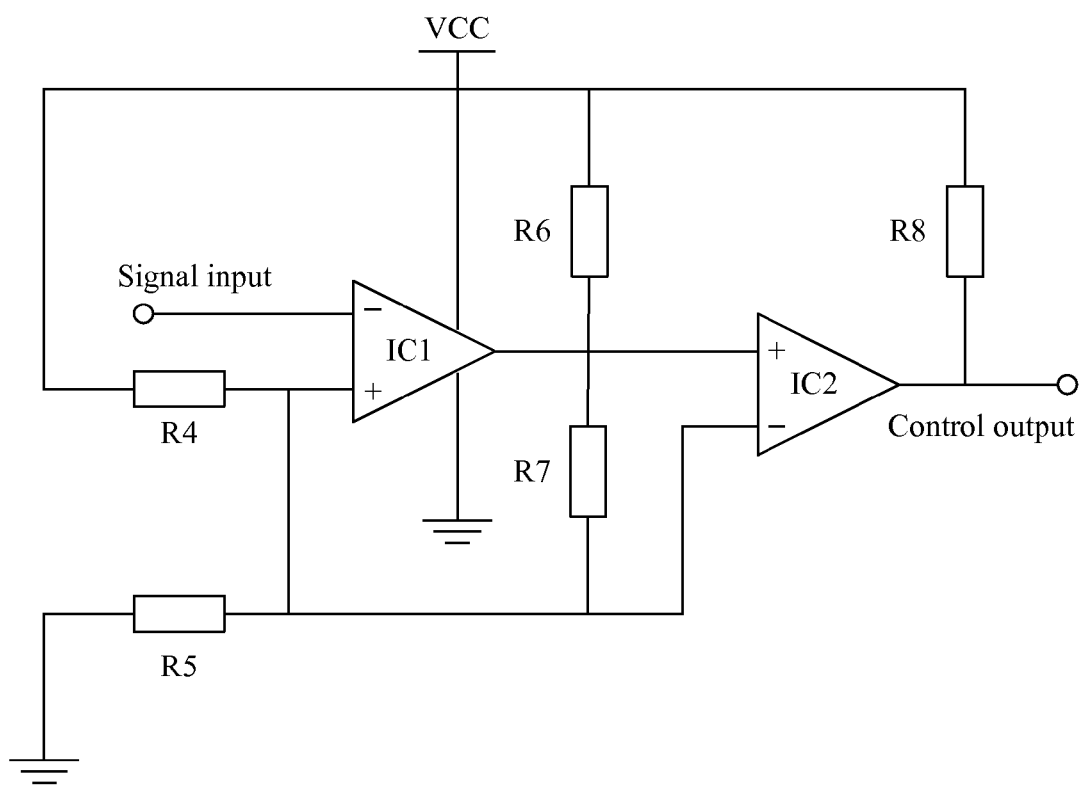
FIG. 2 is a schematic diagram of a trigger circuit of an embodiment of the invention.

As shown in FIG. 2, the trigger circuit comprises multiple resistors R4, R5, R6, R7, and R8, and a pair of comparators IC1 and IC2. As an input voltage is greater than 170 V, the electronic switch D2 is disconnected, and the circuit is a full-bridge rectifier. As the input voltage is less than 145 V, the electronic switch D2 is connected, and the circuit is a double voltage circuit.

Figure 3:
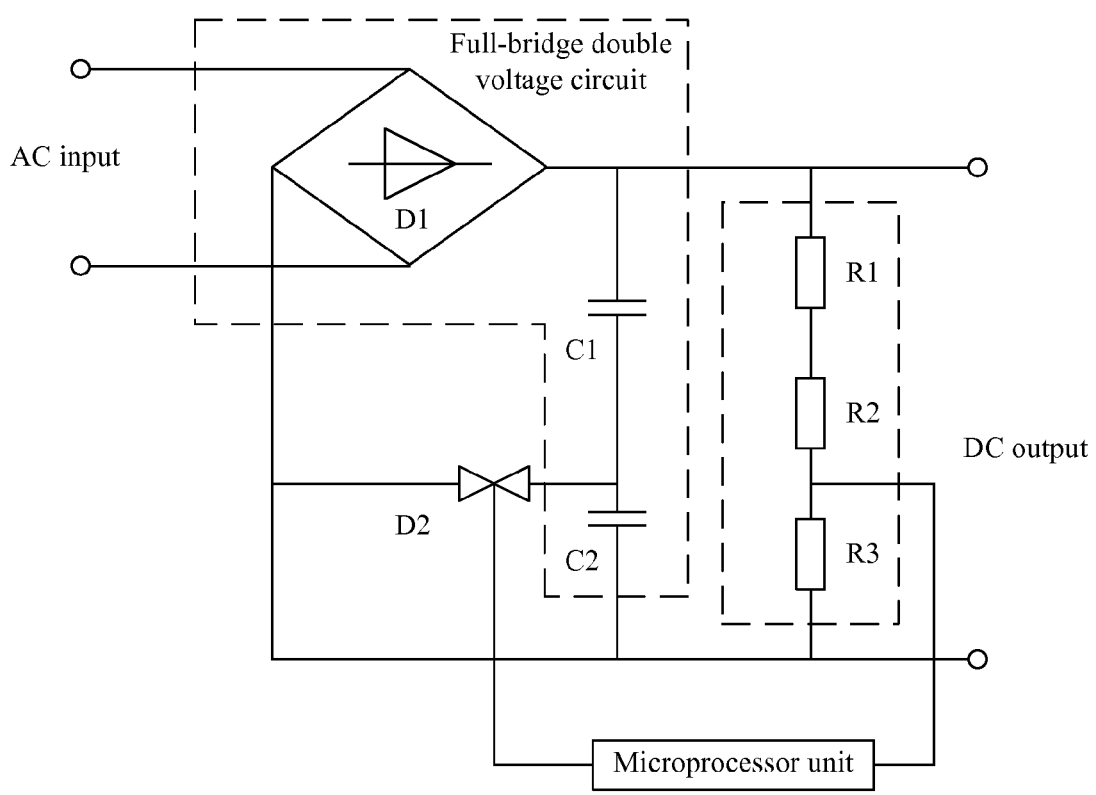
FIG. 3 is a block diagram of a motor controller of an embodiment of the invention.

As shown in FIG. 3, a motor controller of the invention comprises a microprocessor unit having an input terminal and an output terminal, and an AC/DC converting circuit. The AC/DC converting circuit comprises a full-bridge double voltage circuit, an electronic switch D2 having a control terminal, and a detecting circuit having an input terminal and an output terminal.

The full-bridge double voltage circuit comprises a full-bridge rectifier D1 having two input terminals and two output terminals, a first capacitor C1, and a second capacitor C2.

The detecting circuit comprises a first resistor R1, a second resistor R2, and a third resistor R3, and the first resistor R1, the second resistor R2, and the third resistor R3 are serially connected.

The first capacitor C1 and the second capacitor C2 are serially connected between the output terminals of the full-bridge rectifier.

The input terminals of the full-bridge rectifier are connected to an AC input.

One end of the electronic switch D2 is connected between the first capacitor and the second capacitor, and the other end of the electronic switch D2 is connected to one of the output terminals of the full-bridge rectifier.

The input terminal and the output terminal of the detecting circuit are connected to the output terminals of the full-bridge rectifier.

The output terminal of the detecting circuit is connected to the input terminal of the microprocessor unit, and the output terminal of the microprocessor unit is connected to the control end of the electronic switch D2.

In this embodiment, the electronic switch D2 is a bidirectional triode thyristor, the microprocessor unit is a single chip processor or a digital signal processor, and the trigger circuit is a hysteresis loop comparison circuit.

Figure 4:
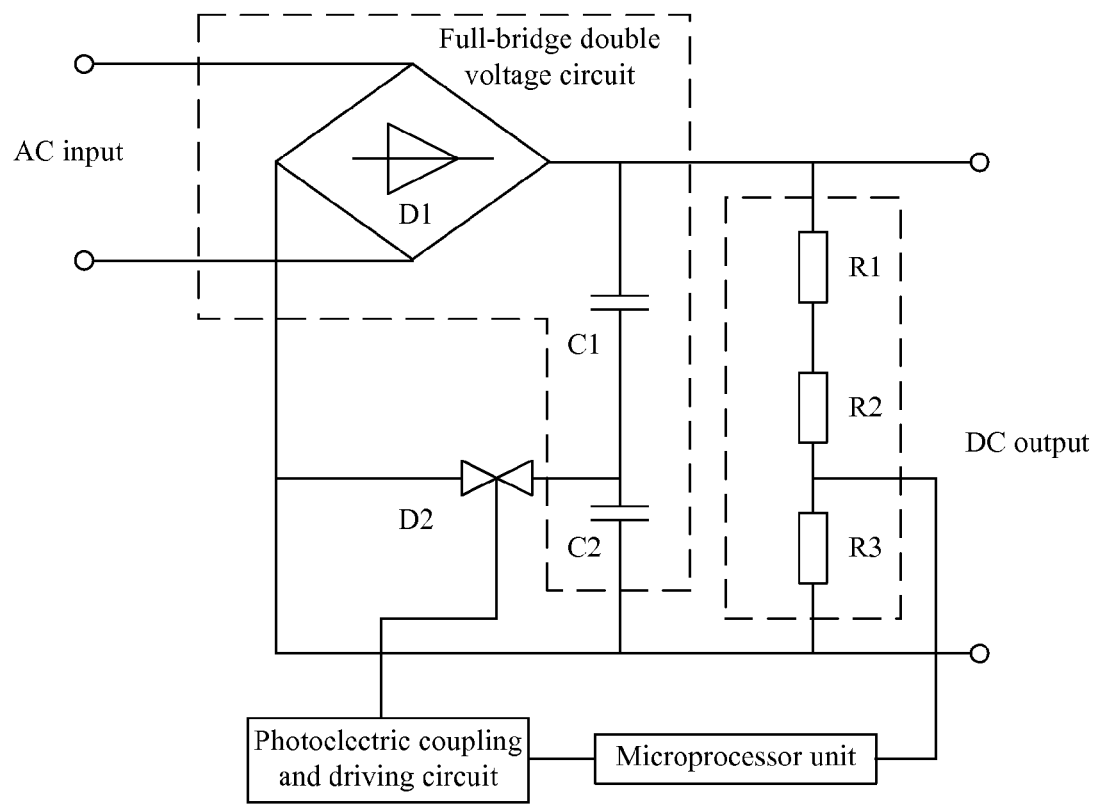
FIG. 4 is a block diagram of a motor controller of another embodiment of the invention.

As shown in FIG. 4, another motor controller of the invention comprises a photoelectric coupling and driving circuit, a microprocessor unit having an input terminal and an output terminal, and an AC/DC converting circuit. The AC/DC converting circuit comprises a full-bridge double voltage circuit, an electronic switch D2 having a control terminal, and a detecting circuit having an input terminal and an output terminal.

The full-bridge double voltage circuit comprises a full-bridge rectifier D1 having two input terminals and two output terminals, a first capacitor C1, and a second capacitor C2.

The detecting circuit comprises a first resistor R1, a second resistor R2, and a third resistor R3, and the first resistor R1, the second resistor R2, and the third resistor R3 are serially connected.

The first capacitor C1 and the second capacitor C2 are serially connected between the output terminals of the full-bridge rectifier.

The input terminals of the full-bridge rectifier are connected to an AC input.

One end of the electronic switch D2 is connected between the first capacitor and the second capacitor, and the other end of the electronic switch D2 is connected to one of the output terminals of the full-bridge rectifier.

The input terminal and the output terminal of the detecting circuit are connected to the output terminals of the full-bridge rectifier.

The output terminal of the detecting circuit is connected to the input terminal of the microprocessor unit, and the output terminal of the microprocessor unit is connected to the control end of the electronic switch D2.

The microprocessor unit is connected to the electronic switch D2 via the photoelectric coupling and driving circuit.

In this embodiment, the electronic switch D2 is a bidirectional triode thyristor, the microprocessor unit is a single chip processor or a digital signal processor, and the trigger circuit is a hysteresis loop comparison circuit.

Figure 5:
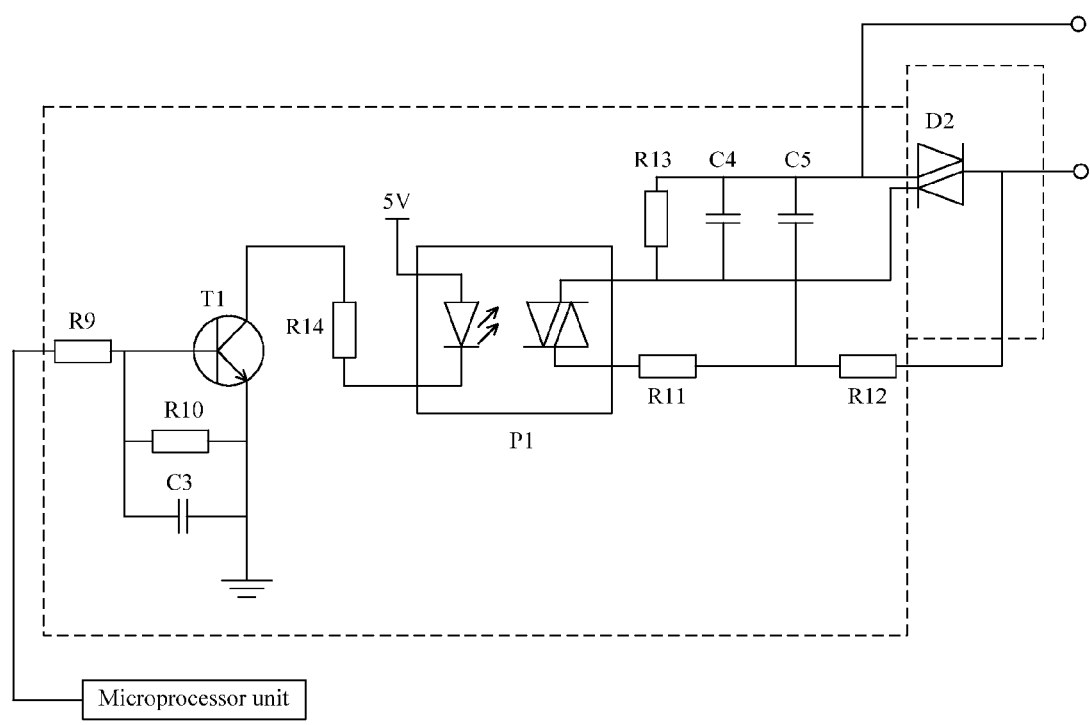
FIG. 5 is a schematic diagram of a photoelectric coupling and driving circuit of an embodiment of the invention.

As shown in FIG. 5, the photoelectric coupling and driving circuit comprises multiple resistors R9, R10, R11, R12, R13, and R14, multiple capacitors C3, C4, and C5, a triode T1, and a photoelectric coupler P1.

The AC/DC converting circuit of the invention is simple and cost-effective, and components therein are small. Moreover, automatic switching between the full-bridge rectifier and the full-bridge double-voltage circuit makes the invention convenient for use. In addition, automatic switching between the full-bridge rectifier and the full-bridge double-voltage circuit guarantees a stable output voltage, which brings no damage to the motor and the motor controller, and improves safety and reliability of the circuit.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An AC/DC converting circuit, comprising
a full-bridge double voltage circuit, comprising
   a full-bridge rectifier having two input terminals and two output terminals;
   a first capacitor; and
   a second capacitor;
an electronic switch having a control terminal;
a trigger circuit having an input terminal and an output terminal; and
a detecting circuit having an input terminal and an output terminal; wherein
said first capacitor and said second capacitor are serially connected between said output terminals of said full-bridge rectifier;
said input terminals of said full-bridge rectifier are connected to an AC input;
one end of said electronic switch is connected between said first capacitor and said second capacitor;
the other end of said electronic switch is connected to one of said output terminals of said full-bridge rectifier;
said input terminal and said output terminal of said detecting circuit are connected to said output terminals of said full-bridge rectifier;
said output terminal of said detecting circuit is connected to an input terminal of said trigger circuit; and
said output terminal of said trigger circuit is connected to said control terminal of said electronic switch.

2. The AC/DC converting circuit of claim 1, wherein said electronic switch is a bidirectional triode thyristor.

3. The AC/DC converting circuit of claim 1, wherein said detecting circuit comprises a first resistor, a second resistor, and a third resistor.

4. The AC/DC converting circuit of claim 3, wherein said first resistor, said second resistor, and said third resistor are serially connected.

5. The AC/DC converting circuit of claim 1, wherein said trigger circuit is a hysteresis loop comparison circuit.

6. A motor controller, comprising
a microprocessor unit having an input terminal and an output terminal; and
an AC/DC converting circuit, comprising
   a full-bridge double voltage circuit, comprising
      a full-bridge rectifier having two input terminals and two output terminals;
      a first capacitor; and
      a second capacitor;
   an electronic switch having a control terminal; and
   a detecting circuit having an input terminal and an output terminal; wherein
   said first capacitor and said second capacitor are serially connected between said output terminals of said full-bridge rectifier;
   said input terminals of said full-bridge rectifier are connected to an AC input;
   one end of said electronic switch is connected between said first capacitor and said second capacitor;
   the other end of said electronic switch is connected to one of said output terminals of said full-bridge rectifier;
   said input terminal and said output terminal of said detecting circuit are connected to said output terminals of said full-bridge rectifier;
   said output terminal of said detecting circuit is connected to said input terminal of said microprocessor unit; and
   said output terminal of said microprocessor unit is connected to said control end of said electronic switch.

7. The motor controller of claim 6, wherein said electronic switch is a bidirectional triode thyristor.

8. The motor controller of claim 6, wherein said detecting circuit comprises a first resistor, a second resistor, and a third resistor.

9. The motor controller of claim 8, wherein said first resistor, said second resistor, and said third resistor are serially connected.

10. The motor controller of claim 6, wherein said microprocessor unit is a single chip processor or a digital signal processor.

11. A motor controller, comprising
a photoelectric coupling and driving circuit;
a microprocessor unit having an input terminal and an output terminal; and
an AC/DC converting circuit, comprising
   a full-bridge double voltage circuit, comprising
      a full-bridge rectifier having two input terminals and two output terminals;
      a first capacitor; and
      a second capacitor;
   an electronic switch having a control terminal; and
   a detecting circuit having an input terminal and an output terminal; wherein
   said first capacitor and said second capacitor are serially connected between said output terminals of said full-bridge rectifier;
   said input terminals of said full-bridge rectifier are connected to an AC input;
   one end of said electronic switch is connected between said first capacitor and said second capacitor;

the other end of said electronic switch is connected to one of said output terminals of said full-bridge rectifier;

said input terminal and said output terminal of said detecting circuit are connected to said output terminals of said full-bridge rectifier;

said output terminal of said detecting circuit is connected to said input terminal of said microprocessor unit;

said output terminal of said microprocessor unit is connected to said control end of said electronic switch; and said microprocessor unit is connected to said electronic switch via said photoelectric coupling and driving circuit.

12. The motor controller of claim 11, wherein said electronic switch is a bidirectional triode thyristor.

13. The motor controller of claim 11, wherein said detecting circuit comprises a first resistor, a second resistor, and a third resistor.

14. The motor controller of claim 13, wherein said first resistor, said second resistor, and said third resistor are serially connected.

15. The motor controller of claim 11, wherein said microprocessor unit is a single chip processor or a digital signal processor.

16. The motor controller of claim 11, wherein said photoelectric coupling and driving circuit comprises a fourth resistor, a fifth resistor, a sixth resistor, a seventh resistor, an eighth resistor, a ninth resistor, a third capacitor, a fourth capacitor, a fifth capacitor, a triode, and a photoelectric coupler.

* * * * *